CONDIT PRUDDEN.

Improvement in Machines for Bending Wood.

No. 4,357.

Reissued April 25, 1871.

Witnesses { John Parker
Thomas M. Evans

Condit Prudden
By his Attys
Thomson & Co

AM. PHOTO-LITHOGRAPHIC CO. N.Y. (OSBORNE'S PROCESS)

United States Patent Office.

CONDIT PRUDDEN, OF PHILADELPHIA, PENNSYLVANIA.

Letters Patent No. 54,012, dated April 17, 1866; reissue No. 4,357, dated April 25, 1871.

IMPROVEMENT IN MACHINES FOR BENDING WOOD.

The Schedule referred to in these Letters Patent and making part of the same.

I, CONDIT PRUDDEN, of Philadelphia, county of Philadelphia, State of Pennsylvania, have invented a Mold wherewith to Bend the Side Bars of Saddle-Trees, of which the following is a specification.

*Nature and Object of the Invention.*

My invention consists of a certain mold, made in the peculiar manner fully described hereafter, for bending the side bars of saddle-trees.

*Description of the Accompanying Drawing.*

Figure 2:
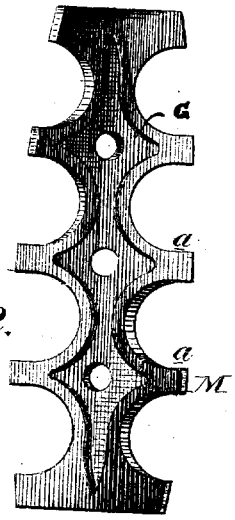
Figure 3:
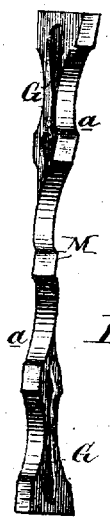
Figure 5:
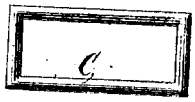
Figure 6:
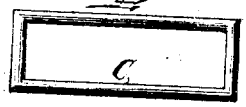
Figure 1:
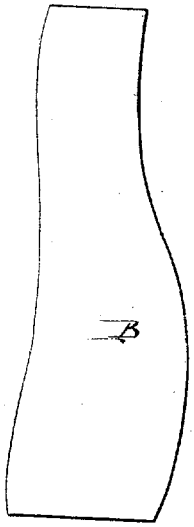
Figure 4:
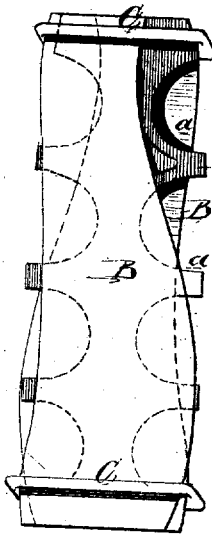

Figure 1 represents the strip of wood to be bent to the desired shape of a side bar for saddle-trees;

Figure 2, a front view of the mold by which the desired shape is imparted to the side bars;

Figure 3, an edge view of the mold;

Figure 4, a view illustrating the mode of confining the side bars to the mold; and Figures 5 and 6 views of the clamps for binding the side bars to the molds.

*General Description.*

As a substitute for the usual side bars of saddle-trees I bend strips of wood to the proper form by means of a mold, which I will now proceed to describe.

The mold or former M is of iron or other metal, and has its faces inclined and curved in accordance with the shape to which it is desirable to bend and twist the wooden strips to be converted into side bars.

In each face of the mold there is a depression, G, communicating with holes made directly through the mold, and the latter has in its opposite edges recesses *a a* of such dimensions that they will not detract from the strength of the mold or impair its utility as a means of imparting its twisted shape to the wooden strips.

I take two strips, B B, after they have been well steamed, and placing one on each side of the mold, press the ends against the same and confine them by the clamps C C in a manner which will be readily understood by referring to fig. 4.

The strips are permitted to remain in this condition until they are thoroughly dried, a process facilitated by the recesses, which permit air to gain free access to the wood.

When dried the strips will be found to be permanently bent and ready for use in constructing a saddle-tree, the strips being connected to the pommel and cantel in the usual manner.

*Claim.*

A mold, M, formed and recessed substantially as described.

In testimony whereof I have signed my name to this specification in the presence of two subscribing witnesses.

C. PRUDDEN.

Witnesses:
WM. A. STEEL,
F. B. RICHARDS.